United States Patent
Giroux et al.

(10) Patent No.: US 6,911,109 B2
(45) Date of Patent: Jun. 28, 2005

(54) TWO-PART, ROOM TEMPERATURE CURABLE EPOXY RESIN/(METH)ACRYLATE COMPOSITIONS AND PROCESS FOR USING SAME TO BOND SUBSTRATES

(75) Inventors: Donald J. Giroux, Cohasset, MA (US); Robert H. Pauze, Middleboro, MA (US); Charles F. Schuft, Stow, MA (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 09/734,477

(22) Filed: Dec. 11, 2000

(65) Prior Publication Data

US 2002/0117259 A1 Aug. 29, 2002

(51) Int. Cl.$^7$ .......................... C08F 283/10; C08L 63/00
(52) U.S. Cl. ........................ 156/305; 156/330; 525/530
(58) Field of Search .......................... 525/530; 156/305, 156/330

(56) References Cited

U.S. PATENT DOCUMENTS

| | | | |
|---|---|---|---|
| 2,633,458 A | 3/1953 | Shokal | |
| 2,768,153 A | 10/1956 | Shokal | |
| 2,824,851 A | 2/1958 | Hall | |
| 2,847,395 A | 8/1958 | Wear | |
| 2,890,202 A | 6/1959 | Parker | |
| 2,992,193 A | 7/1961 | Porret et al. | |
| 3,066,112 A | 11/1962 | Bowen | |
| 3,156,580 A | 11/1964 | Howard | |
| 3,300,547 A | 1/1967 | Gorman et al. | |
| 3,316,040 A | 4/1967 | Tobak | |
| 3,337,406 A | 8/1967 | Newey et al. | |
| 3,591,438 A | 7/1971 | Toback et al. | |
| 3,684,617 A | 8/1972 | Windecker | |
| 3,725,504 A | 4/1973 | Owston | |
| 3,832,274 A | 8/1974 | Owston | |
| 3,870,675 A | 3/1975 | Kusayama et al. | |
| 3,873,640 A | 3/1975 | Owston et al. | |
| 3,890,407 A | 6/1975 | Briggs, Jr. et al. | |
| 3,912,773 A | 10/1975 | Havriliak | |
| 3,940,537 A | 2/1976 | Burns | |
| 3,994,764 A | 11/1976 | Wolinski | |
| 3,997,694 A | 12/1976 | Wu | |
| 4,051,195 A * | 9/1977 | McWhorter ................. 525/530 |
| 4,053,680 A | 10/1977 | Wasserman et al. | |
| 4,055,541 A | 10/1977 | Riew | |
| 4,092,443 A | 5/1978 | Green | |
| 4,126,504 A | 11/1978 | Wolinski et al. | |
| 4,168,338 A | 9/1979 | Kato et al. | |
| 4,182,644 A | 1/1980 | Briggs, Jr. et al. | |
| 4,218,279 A | 8/1980 | Green | |
| 4,219,377 A | 8/1980 | Albrecht | |
| 4,220,513 A | 9/1980 | Green et al. | |
| 4,228,062 A | 10/1980 | Lee, Jr. et al. | |
| 4,235,986 A | 11/1980 | Catena | |
| 4,237,242 A * | 12/1980 | Frankel ....................... 525/119 |
| 4,243,706 A | 1/1981 | Williams | |
| 4,251,565 A | 2/1981 | Bowen | |
| 4,252,592 A | 2/1981 | Green | |
| 4,252,593 A | 2/1981 | Green | |
| 4,276,352 A | 6/1981 | Green | |
| 4,282,353 A | 8/1981 | Green | |
| 4,308,367 A | 12/1981 | Green et al. | |
| 4,339,567 A | 7/1982 | Green et al. | |
| 4,368,253 A | 1/1983 | Green et al. | |
| 4,383,025 A | 5/1983 | Green et al. | |
| 4,391,958 A | 7/1983 | Minato et al. | |
| 4,398,014 A | 8/1983 | Green et al. | |
| 4,413,052 A | 11/1983 | Green et al. | |
| 4,416,975 A | 11/1983 | Green et al. | |
| 4,426,243 A | 1/1984 | Briggs | |
| 4,536,546 A | 8/1985 | Briggs | |
| 4,552,604 A | 11/1985 | Green | |
| 4,668,736 A | 5/1987 | Robins et al. | |
| 4,714,730 A | 12/1987 | Briggs et al. | |
| 4,755,571 A * | 7/1988 | Irving et al. ................. 525/530 |
| 4,773,957 A | 9/1988 | Briggs | |
| 4,892,764 A | 1/1990 | Drain et al. | |
| 5,137,990 A * | 8/1992 | Corley ....................... 525/530 |
| 5,643,994 A | 7/1997 | Kish et al. | |
| 5,945,461 A | 8/1999 | Gosiewski et al. | |
| 6,248,204 B1 * | 6/2001 | Schuft ........................ 156/305 |

FOREIGN PATENT DOCUMENTS

| | | | |
|---|---|---|---|
| GB | 2179955 | | 3/1987 |
| GB | 2166447 | | 5/1987 |
| WO | WO 95/181183 | * | 7/1995 |
| WO | WO 00/02204 | | 1/2000 |
| WO | WO 00/40663 | * | 7/2000 |

* cited by examiner

*Primary Examiner*—Steven D. Maki
(74) *Attorney, Agent, or Firm*—Steven C. Bauman

(57) ABSTRACT

The present invention provides two part, room-temperature curable epoxy resin/(meth)acrylate compositions. The compositions provide among other advantageous properties high flash point and low odor, and reaction products thereof demonstrate at least comparable and often improved fixture time, improved adhesion strength, and improved adhesion strength over time, to substrates which are ordinarily difficult to bond (such as plastics) with epoxy-based compositions, as contrasted to commercially available comparable products that are of low flash point and higher odor.

27 Claims, No Drawings

TWO-PART, ROOM TEMPERATURE CURABLE EPOXY RESIN/(METH)ACRYLATE COMPOSITIONS AND PROCESS FOR USING SAME TO BOND SUBSTRATES

BACKGROUND OF THE INVENTION

1. Field of the Invention

The present invention provides two part, room-temperature curable epoxy resin/(meth)acrylate compositions. The compositions provide among other advantageous properties high flash point and low odor, and reaction products thereof demonstrate comparable and often improved fixture time, improved adhesion strength, and improved adhesion strength over time, to substrates which are ordinarily difficult to bond (such as plastics) with epoxy-based compositions, as contrasted to commercially available comparable products that are of low flash point and higher odor.

2. Brief Description of Related Technology

Two-part epoxy resin compositions are known. See e.g., U.S. Pat. No. 4,668,736 (Robins). Such compositions are formulated in a two-part manner so as to allow the system to be reactive at room temperature when the two parts are mixed together. Ordinarily, in one of the parts there is provided an epoxy resin and in the other of the parts there is provided a hardener. To one or the other of the parts may be included additional materials to alter the physical properties of either part individually or when mixed together in its uncured state, or of the cured reaction product.

Acrylic-based adhesive compositions are well known. See e.g., U.S. Pat. No. 4,536,546 (Briggs). While adhesives based on this technology appear to have been sold under the tradenames PLEXUS MA 300 and 310 by Illinois Tool Works Inc., Chicago, Ill., they oftentimes exhibit an obnoxious odor and/or have high toxicity, causing in some end users a reluctance to use them. In addition, these adhesives possess a low flash point—meaning they are flammable—causing enhanced safety concerns to distributors, transporters and end users. Moreover, while the adhesives may provide adequate dry to touch time and fixture time, improvements of such properties would be desirable.

Two-part epoxy resin compositions are also known, where one of the parts includes an acrylic-based adhesive. For instance, U.S. Pat. No. 4,426,243 (Briggs) describes an adhesive composition that is prepared from two different adhesive materials—one being an epoxy resin and the other an acrylate-based adhesive—, being chemically bonded together by a bifunctional component having as one of its functional groups an epoxy and as the other an acrylate. See also U.K. Patent No. GB 2166447B.

In addition, International Publication No. PCT/US98/12260 discloses a polymerizable composition for use with an aerobic initiator that is based on ethylenically unsaturated monomers, such as (meth)acrylates, which have a boiling point of at least 160° C., an average monomer fluorophilicity of at about 3.25, and polymers thereof have a glass transition state of at least −20° C. These compositions are said to be useful in bonding low surface energy substrates.

Accordingly, it would be desirable to provide the benefits of both an epoxy resin-based adhesive and an acrylate-based adhesive without many of the perceived detriments to either of these adhesive types, or those adhesives using a combination of those chemistries. For instance, oftentimes industrial end users of such adhesives, for instance acrylate-based adhesives, have commented that commercially available adhesive compositions possess an obnoxious odor, contain highly toxic constituents, and/or possess flash points that make using the adhesives particularly cumbersome or unattractive because of safety issues. In addition, in their cured state (or reaching the cured state), industrial end users have commented that the commercially available adhesive compositions, such as epoxy-based adhesives, do not reach a significant fixture strength in a rapid enough time period. End user perception in this regard has in part provided an obstacle to the continued growth of the market of such adhesives.

There, therefore, is deemed to be a need for epoxy-based compositions that address the marketplace issues identified above.

SUMMARY OF THE INVENTION

The present invention satisfies these issues by providing two part, room-temperature curable epoxy resin/acrylate compositions, which among other provide advantageous properties of high flash point and low odor, and reaction products thereof demonstrate improved fixture time and dry-to-touch timing. In addition, the compositions provide a controlled pot life and cure profile, and reaction products thereof possess resistance to water, high peel strength, high lap shear strength and utility on a wide variety of substrates, particularly those that are ordinarily difficult to bond with epoxy-based compositions (such as plastics).

The compositions include an epoxy resin first component, and an epoxy resin hardener second component.

In either of the first component, the second component, or both, may also be included an inorganic and/or organic filler component. For instance, the first component may include as an inorganic and/or organic filler component a structural reinforcement component, and/or the second component may include an inorganic and/or organic filler component, such as one that confers thixotropy to the composition, added adhesion strength and/or toughness maintenance to cured reaction products of the composition.

Cured reaction products of the composition demonstrate improved fixture time, improved adhesion strength, and at least substantial maintenance over time of adhesion strength after exposure to elevated temperature conditions, moisture and/or a chemical environment. The cured reaction products often demonstrate improvements in more than one of such physical properties.

The invention also provides methods of preparing the inventive compositions, as well as methods of using the compositions to bond together two substrates.

Of course, the invention also provides cured reaction products of the inventive compositions.

The benefits and advantages of the present invention will become more readily apparent after a reading of the "Detailed Description of the Invention".

DETAILED DESCRIPTION OF THE INVENTION

As noted above, the present invention provides two part, room-temperature curable epoxy resin/(meth) acrylate compositions. More specifically, the compositions possess high flash points and low odor, and includes as a first component the combination of an epoxy resin and a (meth)acrylate component, and as a second component, the combination of epoxy resin hardener and a catalyst based on a transition metal complex. Either the first component, the second component, or both, may further include an inorganic and/or organic filler component. Cured reaction products of the composition demonstrate at least comparable if not improved, physical properties selected from improved fixture time, improved adhesive strength, and at least substantial maintenance of adhesion strength over time after exposure to elevated temperature conditions, moisture and/or a chemical environment.

The epoxy resin of the first component of the present invention may include any common epoxy resin, which may have at least one multifunctional epoxy resin.

Examples of such epoxy resins include $C_4$–$C_{28}$ alkyl glycidyl ethers; $C_2$–$C_{28}$ alkyl- and alkenyl-glycidyl esters; $C_1$–$C_{28}$ alkyl-, mono- and poly-phenol glycidyl ethers; polyglycidyl ethers of pyrocatechol, resorcinol, hydroquinone, 4,4'-dihydroxydiphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphenyl)methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N,N'-diglycidyl-4-aminophenyl glycidyl ether; N,N,N',N'-tetraglycidyl-1,3-propylene bis-4-aminobenzoate; phenol novolac epoxy resin; cresol novolac epoxy resin; sorbitol glycidyl ethers and combinations thereof.

Among the commercially available epoxy resins suitable for use herein are polyglycidyl derivatives of phenolic compounds, such as those available under the tradenames EPON 828, EPON 1001, EPON 1009, and EPON 1031, from Shell Chemical Co.; DER 331, DER 332, DER 334, and DER 542 from Dow Chemical Co.; GY285 from Ciba Specialty Chemicals; and BREN-S from Nippon Kayaku, Japan. Other suitable epoxy resins include polyepoxides prepared from polyols and the like and polyglycidyl derivatives of phenol-formaldehyde novolacs, the latter of which are available commercially under the tradenames DEN 431, DEN 438, and DEN 439 from Dow Chemical Co. Cresol analogs are also available commercially ECN 1235, ECN 1273, and ECN 1299 from Ciba Specialty Chemicals. SU-8 is a bisphenol A-type epoxy novolac available from Shell Chemical Co. (formerly, Interez, Inc.). Polyglycidyl adducts of amines, aminoalcohols and polycarboxylic acids are also useful in this invention, commercially available resins of which include GLYAMINE 135, GLYAMINE 125, and GLYAMINE 115 from F.I.C. Corporation; ARALDITE MY-720, ARALDITE MY-721, ARALDITE 0500, and ARALDITE 0510 from Ciba Specialty Chemicals and PGA-X and PGA-C from the Sherwin-Williams Co. And of course combinations of the different epoxy resins are also desirable for use herein.

In a particularly desirable aspect of the invention, the epoxy resin includes the combination of a sorbitol epoxy resin available commercially under the tradename ERISYS GE60 and an epoxy-terminated liquid rubber available commercially from Shell Chemical Co. under the trade designation 58034.

The epoxy resin of the first component of the composition includes an epoxy resin in an amount within the range of about 5 to about 85 weight percent, such as about 25 to about 55 weight percent, based on the total weight of the first component.

As the (meth)acrylate component of the first component of the compositions of the present invention may be used a wide variety of (meth)acrylate monomers. For convenience, the term "(meth)acrylate" is intended to refer to both acrylate and methacrylate, as well as acrylic and methacrylic.

For instance, broadly (meth)acrylate monomers suitable for use as the (meth)acrylate component may be chosen from those represented by $H_2C{=}CGCO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyethylene glycol di(meth)acrylates, tetrahydrofuran (meth)acrylates and di(meth)acrylates, hydroxyethyl (meth)acrylate ("HEMA"), hydroxypropyl (meth)acrylate ("HPMA"), hexanediol di(meth)acrylate trimethylol propane triacrylate ("TMPTA"), trimethylol propane tri(meth)acrylate ("TMPTMA"), diethylene glycol di(meth)acrylate, triethylene glycol di(meth)acrylate, tetraethylene glycol di(meth)acrylate, benzyl (meth)acrylate, dipropylene glycol di(meth)acrylate, di-(pentamethylene glycol) di(meth)acrylate, tetraethylene diglycol diacrylate, diglycerol tetra(meth)acrylate, tetramethylene di(meth)acrylate, ethylene di(meth)acrylate, neopentyl glycol diacrylate, and bisphenol-A di(meth)acrylates, such as ethoxylated bisphenol-A (meth)acrylate ("EBIPMA").

Other (meth)acrylate monomers may also be used, such as reaction products of diglycidylether of bisphenol A or polyglycols with (meth)acrylic acid forming a (meth)acrylate ester, with polyglycols of which corresponding to the structure shown below:

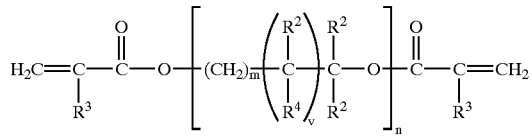

where $R^2$ may be selected from hydrogen, alkyl groups having from 1 to about 4 carbon atoms, hydroxyalkyl groups having from 1 to about 4 carbon atoms or

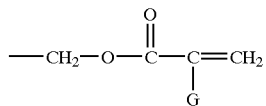

where G is as defined above; $R^3$ may be selected from hydrogen, halogen, and alkyl groups of from 1 to about 4 carbon atoms; $R^4$ may be selected from hydrogen, hydroxy and

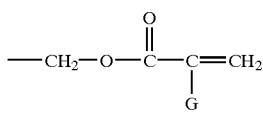

m is an integer equal to at least 1, e.g., from 1 to about 8 or higher, for instance, from 1 to about 4;

v is 0 or 1; and n is an integer equal to at least 1, e.g., 1 to about 20 or more.

Higher-functionalized (meth)acrylates, such as penta, hexa, septa and the like, may also be used. Examples of such higher functionalized (meth)acrylates include pentaerythritol tetra(meth)acrylate, dipentaerythritol penta(meth)acrylate, and polyester (meth)acrylates [e.g., tetra and hexa (meth)acrylate, commercially available examples of which include those sold by UCB Radcure, Inc., Smyrna, Ga. under the trademark "EBECRYL", such as "EBECRYL" 82 (low viscosity modified polyester acrylate having fast cure and high glass transition properties), "EBECRYL" 450 (fast curing fatty acid-modified polyester hexaacrylate with excellent lithographic behavior and good pigment wetting), "EBECRYL" 657 (polyester tetraacrylate with excellent lithographic behavior and pigment wetting for inks), "EBECRYL" 810 (fast curing multi-functional polyester acrylate with low viscosity), "EBECRYL" 830 (multi-functional polyester acrylate having fast cure, abrasion resistance, hardness and solvent resistance) and "EBECRYL" 870 (hexafunctional polyester acrylate oligomer having good lithographic properties with fast cure)].

Urethane-functionalized (meth)acrylates may also be used herein. For instance, UCB offers for sale commercially a number of such materials including those available under the trademark "EBECRYL", such as "EBECRYL" 264 [aliphatic urethane triacrylate diluted 15% with hexanediol di(meth)acrylate ("HDODA"), for providing non-yellowing, fast curing coatings with excellent abrasion and stain resistance, toughness and flexibility], "EBECRYL" 265 [aliphatic urethane triacrylate diluted 25% with tripropylene glycol diacrylate ("TRGDA")], 1290 (hexafunctional aliphatic urethane acrylate containing an acrylated polyol diluent), "EBECRYL" 8301 (hexafunctional aliphatic urethane acrylate containing an acrylated polyol diluent, for providing fast cure with excellent hardness, solvent and abrasion resistance), "EBECRYL" 220 (multi-functional aromatic urethane acrylate containing an acrylated polyol diluent, which provides extremely fast cure with excellent hardness and solvent resistance properties), and "EBECRYL" 6602 (trifunctional aromatic urethane acrylate oligomer diluted to provide coatings with good hardness, scratch and abrasion resistance properties).

In addition, Sartomer Co., Exton, Pa. offers sale commercially a number of such materials including CN 945 A60 (trifunctional urethane acrylate), CN 945 B85 (trifunctional urethane acrylate), CN 970 A60 (urethane acrylate), CN 970 E60 (urethane acrylate), CN 970 A80 (urethane acrylate), CN 972 (urethane acrylate), and CN 975 (hexafunctional urethane acrylate).

Of course, combinations of these (meth)acrylate monomers may also be used as the (meth)acrylate component of the present invention.

An adhesion promoter may also be added to the first component of the inventive composition. For instance, N,N'-dimethylacrylamide ("DMAA") is a widely used adhesion promoter for bonding plastics that finds use in the inventive compositions. Other adhesion promoters include acryloyl morpholine ("ACMO"), and those compounds within the following structures I and II:

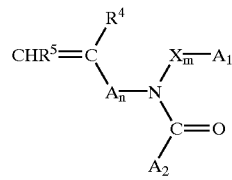

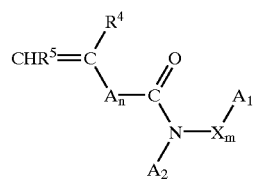

where $R^4$ and $R^5$ may be the same or different and may be selected from hydrogen or $C_{1-3}$ alkyl, or either of which may join to form a cyclic ring structure of between 4 and 10 ring atoms with themselves, or with $A_1$ or $A_2$ as defined below;

X and A may be the same or different and may be selected from $—(CR^6R^7)_p—$, where $R^6$ and $R^7$ may be the same or different and may be selected from hydrogen or $C_{1-3}$ alkyl, and p is an integer of from 0 to 3, an alklyene group ($—CR^8=CR^9—$, where $R^8$ and $R^9$ may be the same or different and may be selected from hydrogen or $C_{1-3}$ alkyl), an arylene group (such as p-phenylene, $—C_6H_4—$), a carbonyl group, $—CO—$, heteroatoms [such as $—O—$, $—S—$, $—NR^8—$ (where $R^8$ may be selected from hydrogen or $C_{1-3}$ alkyl)], and combinations thereof;

m and n may be the same or different and are 0 or 1; and $A_1$ and $A_2$ may be the same or different and may be selected from hydrogen, $C_{1-3}$ alkyl, alkenyl (such as vinyl and allyl), aryl, aryl heterocylic, acidic groups (such as $—CO_2H$, $—SO_3H$, and $—PO(OH)_2$ or salts or esters thereof), and basic groups (such as $—NR^8R^9$, where $R^8$ and $R^9$ are as defined above, or salts thereof, such as onium salts).

Examples of compounds within structure I include N-methyl-N-vinyl acetamide (where $R^4$ and $R^5$ are hydrogen, n and m are 0, and $A_1$ and $A_2$ are $CH_3$); N-vinylcaprolactam (where $R^4$ and $R^5$ are hydrogen, m and n are 0, and $A_1$ and $A_2$ join to form a $—(CH_2)_5—$ group which together with the $—N—CO—$ group forms a seven membered ring); N-vinylphthalimide (where R and $R_1$ are hydrogen, n is 0, X is carbonyl ($—CO—$), m is 1, and $A_1$ and $A_2$ join to form an o-phenylene ($—C_6H_4—$) group); and N-vinylpyrrolidone (where R and $R_1$ are hydrogen, m and n are 0, and $A_1$ and $A_2$ join to form a $—(CH_2)_3—$ group which together with the $—N—CO—$ group forms a five membered ring structure.

Examples of compounds within structure II include diacetone acrylamide (where $R^4$, $R^5$ and $A_2$ are hydrogen, n is 0, X is $—C(CH_3)_2—CO—$, m is 1 and $A_1$ is $CH_3$); 2-acrylamido 2-methyl 1-propane sulphonic acid (where $R^4$, $R^5$ and $A_2$ are hydrogen, n is 0, X is $—C(CH_3)_2—CH_2—$, m is 1, and $A_1$ is $CH_3$); and 2-methacryloxyethyl phenyl urethane (where R and $A_2$ are hydrogen, A is $—C(=O)CH_2CH_2O—$, n is 1 m is 0 and $A_1$ is phenyl).

The first component may also include an inorganic and/or organic filler component, which may act as a structural reinforcement component, a thixotropy-conferring component, a thermally or electrically conducting component, an adhesion strength-conferring component and/or a toughness maintenance component. In the first component, the inorganic and/or organic filler component may be chosen from the group of glass fibers, synthetic fibers, reinforcing silicas, ceramic fiber whiskers, nitrides, such as aluminum nitride, boron nitride, silicon nitride, and silica-coated aluminum nitride, quartz, diamond, carbonates, such as calcium carbonate, magnesium carbonate and the like, alumina, silver, aluminum, zinc, zinc oxide and the like, natural fibers, such as ground nut shell, ground feathers and the like, and combinations thereof.

For instance, glass fibers, such as 739 DC milled fiber 1/32, may be used in an amount up to about 10 weight percent, such as in the range of about 1 to about 3 weight percent, based on the total weight of the epoxy resin.

Synthetic fibers, such as KEVLAR ARAMID fibers 1F835, available commercially from DuPont, may be in an amount up to about 10 weight percent, such as in the range of about 0.5 to about 3 weight percent, based on the total weight of the epoxy resin.

Reinforcing silicas, such as fused or fumed silicas, may be untreated or treated so as to alter the chemical nature of their surface. Virtually any reinforcing fused or fumed silica may be used.

Examples of such treated fumed silicas include polydimethylsiloxane-treated silicas and hexamethyldisilazane-treated silicas. Such treated silicas are commercially available, such as from Cabot Corporation under the tradename CAB-O-SIL ND-TS, TS610 or TS710, and Degussa Corporation under the tradename AEROSIL, such as AEROSIL R805 or R8200.

Of the untreated silicas, amorphous and hydrous silicas may be used. For instance, commercially available amorphous silicas include AEROSIL 300 with an average particle size of the primary particles of about 7 nm, AEROSIL 200 with an average particle size of the primary particles of about 12 nm, AEROSIL 130 with an average size of the primary particles of about 16 nm; and commercially available hydrous silicas include NIPSIL E150 with an average particle size of 4.5 nm, NIPSIL E200A with and average particle size of 2.0 nm, and NIPSIL E220A with an average particle size of 1.0 nm (manufactured by Japan Silica Kogya Inc.).

A particularly desirable fumed silica is hydrophobic fumed silica, such as AEROSIL R8200, which is treated to render a substantial portion of its silanol groups capped with a polymethylsiloxane moiety. This hydrophobic fumed silica is a particularly desirable choice to act as a structural reinforcement component.

A particularly desirable fumed silica to act as a thixotropy conferring and/or adhesion strength-conferring is CAB-O-SIL TS610.

When used, the fumed silica portion of the inorganic filler component which acts to confer structural reinforcement may be included in an amount up to about 20 weight percent, such as in the range of about 5 to about 15 weight percent, desirably about 8 to about 10 weight percent, based on the total weight of the epoxy resin component.

In total, the inorganic and/or organic filler component should be used in an amount within the range of about 0 to about 80 weight percent based on the total weight of the epoxy resin component, particularly where the filler acts to confer thermal and electrical conductivity to the composition.

Optionally, the inventive composition may include in the first component a separate, silane-based adhesion promoter component, which supplements the (meth)acrylate component. Such silane-based adhesion promoters include octyl trimethoxy silane, glycidoxypropyl trimethoxy silane, methacryloxypropyl trimethoxy silane, aminosilanes, mercaptosilanes, and other functionalized silanes, and combinations thereof.

When present, the silane-based adhesion promoter should be used in an amount within the range of about 0.05 to about 5 weight percent, based on the total weight of the epoxy resin component.

The second component includes an epoxy resin hardener and a catalyst based on a transition metal complex.

The epoxy resin hardener may be any suitable one, though particularly desirable ones include polyether amine-based hardeners, such as oxyethylene diamines, oxyethylene triamines, polyoxyethylene diamines, polyoxyethylene triamines, oxypropylene diamines, oxypropylene triamines, polyoxypropylene diamines, polyoxypropylene triamines, dimethylene glycol dipropyl amine and/or derivatives and adducts thereof, and combinations thereof.

Commercially available examples of such polyether amine-based hardeners include those from BASF Corporation, Mt. Olive, N.J., under the trade designation 4,7,10 TTD (trioxatridecane diamine), and Huntsman Corporation, Houston, Tex., under the JEFFAMINE tradename, such as JEFFAMINE D-230, JEFFAMINE D-400, JEFFAMINE D-2000, JEFFAMINE T-403, JEFFAMINE ED-600, JEFFAMINE ED-900, JEFFAMINE ED-2001, JEFFAMINE XTJ-504, JEFFAMINE XTJ-509, JEFFAMINE T-3000, JEFFAMINE T-5000, and combinations thereof.

The JEFFAMINE D series are diamine based products and may be represented by

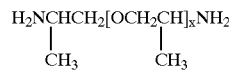

(CAS Registry No. 904610-0) where x is about 2.6 (for JEFFAMINE D-230), 5.6 (for JEFFAMINE D-400) and 33.1 (for JEFFAMINE D-2000), respectively.

The JEFFAMINE T series are trifunctional amine products based on propylene oxide and may be represented by

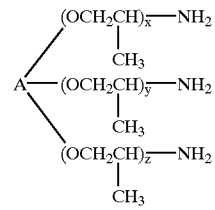

where x, y and z are set forth below in Table A.

TABLE A

| | JEFFAMINE | Approx. | Mole |
|---|---|---|---|
| Product | Initiator (A) | Mol. Wt. | PO |
| T-403 | Trimethylolpropane | 440 | 5–6 |
| T-3000 | Glycerine | 3,000 | 50 |
| T-5000 | Glycerine | 5,000 | 85 |

Additional hardeners available commercially include those from Air Products, such as those under the ANCAM- IDE tradename like ANCAMIDE 2353 (accelerator-modified polyamide).

More specifically, the JEFFAMINE T-403 product is a trifunctional amine and may be represented by

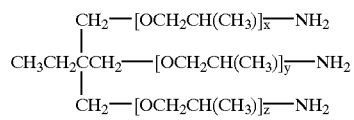

where x+y+z is 5.3

(CAS Registry No. 39423-51-3)

The JEFFAMINE ED series are polyether diamine-based products and may be represented by

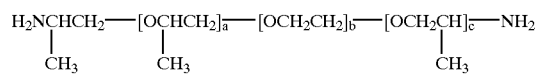

where a, b and c are set forth below in Table B.

Table B

| JEFFAMINE Product | Approx. Value B | a + c | Approx. Mol. wt. |
|---|---|---|---|
| ED-600 | 8.5 | 2.5 | 600 |
| ED-900 | 15.5 | 2.5 | 900 |
| ED-2001 | 40.5 | 2.5 | 2,000 |

The amine-based hardener should be used in an amount within the range of about 10 to about 100 weight percent, such as about 50 to about 75 weight percent, based on the total weight of the second component.

The second component includes a catalyst, which is often a transition metal complex. The transition metal complex may be chosen from a variety of organometallic materials, such as $M_e[CW_3—CO—CH=C(O^-)—CW'_3]_2$, where Me is selected from Fe, Ti, Ru, Co, Ni, Cr, Cu, Mn, Pd, Ag, Rh, Pt, Zr, Hf, Nb, V, and Mo, and W and W' may be the same or different and may be selected from H, and halogens, such as F and Cl. Examples of such materials include platinum (II) acetylacetonate ("PtACAC"), cobalt (II) acetylacetonate ("Co(II)ACAC"), cobalt (III) acetylacetonate ("Co(III) ACAC"), nickel (II) acetylacetonate ("NiACAC"), iron (II) acetylacetonate ("Fe(II)ACAC"), iron (III) acetylacetonate ("Fe(III)ACAC"), chromium (II) acetylacetonate ("Cr(II) ACAC"), chromium (III) acetylacetonate ("Cr(III)ACAC"), manganese (II) acetylacetonate ("Mn(II)ACAC"), manganese (III) acetylacetonate ("Mn(III)ACAC") and copper (II) acetylacetonate ("CuACAC"), and conventional carboxylates and/or complexes of any of Fe, Ti, Ru, Co, Ni, Cr, Cu, Mn, Pd, Ag, Rh, Pt, Zr, Hf, Nb, V, and Mo.

Of course, combinations of these transition metal complexes may also be employed.

The transition metal complex should be used in the inventive compositions in an amount within the range of about 0.00005 to about 1.0 weight percent, such as about 0.02 to about 0.1 weight percent, with about 0.04 to about 0.1 weight percent being particularly desirable.

The epoxy resin hardener may also include an inorganic and/or organic filler component, such as any of those recited above. The inorganic filler component here confers thixotropy to the composition in its uncured state and improved adhesive strength to the cured reaction products of the composition. Desirably, the filler component is a powder of polyethylene or nylon, such as GRILTEX commercially available from EMS Grilon Corp. The amount of the inorganic and/or organic filler component in the second component should be up to about 80 weight percent, such as within the range of about 10 to about 30 weight percent, desirably 28 weight percent, based on the total weight of the second component.

Optionally, an accelerator may be included. Appropriate accelerators include nonylphenol, dinonylphenol, piperazine, and triethanolamine (all of which are available commercially from Huntsman Corporation). Other accelerators include water, alcohols, other phenolics, fast curing amines, and acids and their salts. Of course, combinations of these accelerators may also be used.

When present, the accelerator may be used in an amount up to about 50 weight percent, such as about 0.5 to about 15 weight percent based on the total weight of the epoxy resin hardener component.

The transition metal complex generates a free radical to initiate the polymerization of the (meth)acrylate portion of the first part. More specifically, where a peroxide is present in the first part, the transition metal complex catalyzes the decomposition of the peroxide to form free radicals. Many peroxides may be used in this regard. For instance, t-butyl perbenzoate, cumene hydroperoxide, acyl peroxides, peroxy ketals and the like.

The first component should be used in a ratio to the second component, in the range of about 1:1 to about 10:1, such as about 2:1. Of course, those persons of ordinary skill in the art will be able to make appropriate choices among the various components based on the description of the invention and the representative examples and guidelines set forth herein, to prepare a composition suitable to achieve the desired objective at hand.

The composition ordinarily has a shear thinning viscosity of less than about 300,000 cps at ordinary shear rates at about room temperature.

The composition is useful in many applications, such as bonding together substrates, at least one of which is constructed of a metal or a synthetic material. Examples of such metals include steel and aluminum; and of the synthetic materials are glass cloth phenolics, phenolic composites, plastics and the like. See Examples section below.

The present invention also provides processes for using the inventive compositions to bond together two substrates. For instance, in one such process, the composition is applied onto a surface of a first substrate, and thereafter a surface of a second substrate is mated in abutting relationship with the composition-applied first substrate to form an assembly. The mated assembly is then maintained in the abutting relationship for a time sufficient to allow the composition to cure.

In an alternative process, the composition is applied onto a surface of at least one of a first substrate or a second substrate, and each of the composition-applied substrate(s) is maintained away from the other substrate for a time sufficient to allow the composition to cure to some extent. Then, the substrates are mated in abutting relationship to form an assembly.

In yet another alternative process, a first substrate is mated in spaced apart relationship with a second substrate, and within the space the composition is applied or dispensed. The assembly of the first substrate and the second substrate is then maintained in the relationship for a time sufficient to allow the composition to cure.

Optionally, compositions of the present invention may further contain other additives such as defoaming agents, leveling agents, dyes, pigments and the like.

The amount of composition applied to a substrate surface should be suitably adjusted depending on the nature and dimensions of the substrate and the demands of the application at hand.

Compositions of the present invention may ordinarily be cured under conditions ambient to the end users environment and above, after application onto the desired substrate. In addition, those persons of ordinary skill in the art may render the inventive compositions curable when exposed to radiation in the electromagnetic spectrum, such as UV, VIS, IR, E-beam, radio frequency, and in that event one may wish to include a photoinitiator to facilitate the reaction.

The present invention will be more readily appreciated with reference to the examples, which follow.

EXAMPLES

In these examples, compositions in accordance with the present invention (see Table 1) were prepared and evaluated for performance in contrast with control compositions, results for which are discussed below. The control compositions, PLEXUS MA 300 and 310, are two part, acrylic-based adhesive compositions, and DURABOND 100 CL, which is a two-part, epoxy-based adhesive composition, that is similar from a formulation standpoint to the inventive compositions save for the (meth)acrylate component in the first part and the transition metal complex in the second part. According to material safety data sheets published by the manufacturer, PLEXUS MA 300 adhesive is based on methacrylic acid in an amount between 5 to 15 weight percent and methyl methacrylate monomer in an amount between 50 to 60 weight percent, and PLEXUS MA 310 adhesive is based on maleic acid in an amount between 1 to 10 weight percent, 2,6-di-teriary-butyl-para-cresol in an amount bewtween 1 and 10 weight percent, and methyl methacrylate monomer in an amount between 50 to 60 weight percent.

Two-part, room temperature curable epoxy resin/(meth)acrylate compositions in accordance with this invention were prepared by mixing together with stirring for a period of time of about 10 minutes at room temperature in a first open vessel the constituents as set forth in Table 1-A of the epoxy resin/acrylate component, in a percent by volume basis, based on the total volume of the composition. In addition, the hardener component of the two-part compositions was prepared by mixing together, with stirring for a period of time of about 10 minutes at room temperature in a second open vessel, the constituents as set forth in Table 1-B of the hardener component, in a percent by volume basis, based on the total volume of the composition.

TABLE 1

| Component | | Sample No. /Amt. (wt %) | |
|---|---|---|---|
| Type | Identity | 1 | 2 |
| Epoxy Resin/(Meth)Acrylate -- A | | | |
| Epoxy Resin | Sorbitol Glycidyl Ether (GE-60) | 43.65 | 43.65 |
| | Epoxy-terminated liquid rubber (EPON 58034) | 5 | 5 |
| (Meth) Acrylate | Benzyl methacrylate | 14 | 14 |
| | Tetrahydrofurfyl methacrylate | 10 | 10 |

TABLE 1-continued

| Component | | Sample No. /Amt. (wt %) | |
|---|---|---|---|
| Type | Identity | 1 | 2 |
| Additves | Adhesion Promoter -- N,N'-dimethylacrylamide | 12 | 12 |
| | Accelerators -- Saccharin, APH, and t-butyl perbenzoate | 2.15 | 2.15 |
| | Thixotrope -- CABOSIL TS 720 | 3 | 3 |
| | Toughener -- DEGUSSA R8200 | 7 | 7 |
| | Plasticizer- Cyclohexyl pyrolidone | 1 | 1 |
| | Stabilizers | 0.5 | 0.5 |
| Hardener -- B | | | |
| Hardener | 109 LCDP[1] | 55 | 55 |
| | 109 DP HDR[2] | 12 | 12 |
| Catalyst -- Acrylic | Cu(II)ACAC | 0.1 | 0.06 |
| Catalyst -- Epoxy | p-toluene sulfonic acid | 5 | 5 |
| Inorganic Filler | GRILTEX | 28 | 28 |

[1]Polyglycol diamine adducts of bisphenol A-type epoxy resin (hindered)
[2]Polyglycol diamine adducts of bisphenol A-type epoxy resin (primary amine)

Where applicable, the two components of the composition may be transferred in appropriate volume ratio to a double barrel syringe or cartridge having 2 parallel barrels made of non-reactive plastic. The syringe or cartridge is equipped with a mixing chamber disposed in a location intermediate between the cartridges and the dispense nozzle.

The composition may be used upon formation, or stored for a period of time of up to about 1 to about 2 years at about room temperature without experiencing observable viscosity increases.

Once the components of Sample Nos. 1 and 2 were mixed together, the pot life was determined through observation of the extent of viscosity increase of the composition to a non-trowlable consistency over time. That is, when the composition can no longer be dispensed through the mixing chamber and dispense nozzle. The time values for Sample Nos. 1 and 2 were observed to be 5–6 minutes and 8–9 minutes, respectively. PLEXUS MA 300 and 310 were determined to have a pot life of 10–15 minutes and 15–20 minutes, respectively. These pot lives are comparable to the end user.

Separately, Sample Nos. 1 and 2, and PLEXUS MA 300 and 310, and DURABOND 100 CL, were evaluated for lap shear strength and block shear strength.

As regards the lap shear strength evaluation, these materials were dispensed at the terminal portions of lap shears constructed of a variety of materials, brought together so that a ½ inch overlap of the lap shears was present, and maintained in place while the compositions cured. This evaluation was conducted in accordance with ASTM D1002.

As regards the block shear strength evaluation, these materials were dispensed between a pair of blocks constructed of a variety of materials, brought together, and maintained in place while the compositions cured. This evaluation was conducted in accordance with ASTM D4501.

Results are set forth below in Tables 2a and 2b.

TABLE 2a

Lap Shear Strength

| Substrate | Sample No./(psi) | | | | |
|---|---|---|---|---|---|
| | MA 310 | MA 300 | 1 | 2 | DURABOND 100 CL |
| Grit-blasted mild steel | 699 | 4304 | 3589 | 3766 | 2160 |
| As-received aluminum | 247 | 1101 | 2271 | 3139 | 2070 |
| Nylon | 125 | 105 | 216 | 219 | 170 |
| Polycarbonate | 2446 | 2599 | 425 | 538 | 1030 |

TABLE 2b
Block Shear Strength

| Substrate | Sample No./(psi) | | | | |
|---|---|---|---|---|---|
| | MA 310 | MA 300 | 1 | 2 | DURABOND 100 CL |
| G-10 Epoxyglass | 2942 | 2586 | 2766 | 2987 | 1360 |
| ABS | 1974 | 2515 | 1880 | 2087 | 700 |
| Acrylic | 3410 | 2189 | 876 | 722 | 240 |
| PVC | 2856 | 3496 | 734 | 449 | 2540 |

As can be seen, the results of Sample Nos. 1 and 2 are comparable to the two commercially available comparative products, which are acrylic-based, while as shown below have low odor and high flash point. In addition, when compared with the DURABOND product, which is epoxy-based, the results are quite impressive. More specifically, the block shear strength of Sample Nos. 1 and 2 is particularly good, as compared with the epoxy-based DURABOND product on difficult-to-bond substrates, such as acrylic and nylon.

TABLE 3

| Physical Property on Grit Blasted Mild Steel | Sample No./(psi) | | | |
|---|---|---|---|---|
| | MA 310 | MA 300 | 1 | 2 |
| Heat aging @275° F.--1000 hours soak | 337 | 1563 | 2200 | — |
| 120° F./100% RH--500 hour soak | 1187 | 4389 | 1960 | 2379 |

Again, the results here for Samples Nos. 1 and 2 are comparable to the two commercially available products, particularly when the end user considers that he or she will not be exposed to an obnoxious odor and the potential for a hazardous condition.

The flash points for Samples Nos. 1 and 2 were determined according to standard test method, ASTM D-93-85, entitled, "Tag Closed Cup". The flash points for the first component of Sample No. 1 was determined to be greater than 200° F., the flash point for the second component of Sample No. 1 was determined to be 172.4° F. The flash point for the first component of Sample No. 2 was determined to be 192.2° F. The flash point for the second component of Sample No. 2 was determined to be greater than 200° F.

In contrast, the flash point for the PLEXUS products (MA 300 and MA 310) were determined to be 51° F. for both the first and second components—the adhesive and the activator. The flash points for these PLEXUS products were obtained from material safety data sheets issued by the manufacturer.

The odor of Sample Nos. 1 and 2 and the comparative PLEXUS products were determined by four people, each of whom evaluated each sample three times. The evaluations were conducted on two separate days. A portion of each composition was placed in a container, and the container labeled with a letter code. Each composition was smelled twice on the first day so that a range of odors could be determined. On the second day the compositions were ranked for their odor within that determined range. A 1 to 10 scale, with 1 being the least offensive odor and 10 being the most offensive odor, was used to determine which composition was best and which worst. The determination was based on the strength of the odor or the unpleasantness of the odor—simply the overall effect of the compositions odor was what was determined. The evaluations were conducted under room temperature conditions. Sample Nos. 1 and 2 were determined to have an overall low odor, whereas PLEXUS MA 300 and MA 310 were determined to have medium to high odor in this evaluation.

Fixture time of the compositions was determined using steal lap shears. The Sample Nos. 1 and 2 and the two PLEXUS products were dispensed on a lap shear and mated with a second lap shear so that a ½ inch overlap existed. The fixture time measured the time required for the assembly to support a 3-kilogram weight for 5 seconds. The fixture time for Sample Nos. 1 and 2 were about 7 to 8 minutes and about 12 to 13 minutes, respectively. The fixture time for PLEXUS MA 300 and MA 310 were 5 to 8 minutes and 30 to 35 minutes, respectively. The fixture time for PLEXUS MA 310 product was obtained from a technical data sheet made available by the manufacturer. It is seen that Samples Nos. 1 and 2 demonstrated at least about comparable fixture times, if not a markedly improved fixture time over PLEXUS MA 310.

While described in detail above, the full scope of the invention is measured by the claims.

What is claimed is:

1. A two-part, room-temperature curable composition having high flash point and low odor, comprising:
   (a) a first component, comprising:
      (i) an epoxy resin, and
      (ii) (meth)acrylate component; and
   (b) a second component, comprising:
      (i) an epoxy resin hardener, and
      (ii) a catalyst comprising a transition metal complex, wherein the second component further includes an accelerator selected from the group consisting of nonylphenol, dinonylphenol, piperazine, triethanolamine, water, alcohols, acids and their salts, and combinations thereof, and wherein cured reaction products of the composition demonstrate at least substantial maintenance of at least one physical property selected from the group consisting of fixture time, adhesion strength, and adhesion strength over time, after exposure to at least one condition selected from the group consisting of elevated temperatures, moisture and a chemical environment.

2. The composition according to claim 1, wherein the epoxy resin is a member selected from the group consisting of $C_4$–$C_{28}$ alkyl glycidyl ethers; $C_2$–$C_{28}$ alkyl- and alkenyl-glycidyl esters; $C_1$–$C_{28}$ alkyl-, mono- and poly-phenol glycidyl ethers; polyglycidyl ethers of pyrocatechol, resorcinol, hydroquinone, 4,4'-dihydroxydiphenyl methane, 4,4'-dihydroxy-3,3'-dimethyldiphenyl methane, 4,4'-dihydroxydiphenyl dimethyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphyenyl)methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N,N'-diglycidyl-4-aminophenyl glycidyl ether; N,N,N',N'-tetraglycidyl-1,3-propylene bis-4-aminobenzoate; phenol novolac epoxy resin; cresol novolac epoxy resin sorbitol glycidyl ether; and combinations thereof.

3. The composition according to claim 1, wherein the epoxy resin includes the combination of bisphenol A-type epoxy resin and sorbitol glycidyl ether.

4. The composition according to claim 1, wherein the epoxy resin is present in an amount within the range of about 5 to about 85 weight percent, based on the total weight of the first component.

5. The composition according to claim 1, wherein the (meth)acrylate component is a member selected from the group consisting of polyethylene glycol di(meth)acrylates, tetrahydrofuran (meth)acrylates and di(meth)acrylates, hydroxypropyl (meth)acrylate, hexanediol di(meth)acrylate trimethylol propane triacrylate, trimethylol propane tri(meth)acrylate, diethylene glycol di(meth)acrylate, triethylene glycol di(meth)acrylate, tetraethylene glycol di(meth)acrylate, benzyl (meth)acrylate, dipropylene glycol di(meth)-acrylate, di-(pentamethylene glycol) di(meth)-acrylate, tetraethylene diglycol diacrylate, diglycerol tetra (meth)-acrylate, tetramethylene di(meth)acrylate, ethylene di(meth)-acrylate, neopentyl glycol diacrylate, and bisphenol-A di(meth)acrylates.

6. The composition according to claim 1, wherein the (meth)acrylate component is within the structure represented by $H_2C=CGCO_2R^1$, wherein G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, and sulfone.

7. The composition according to claim 1, wherein the (meth)acrylate component is a member selected from the group consisting of reaction products of diglycidylether of bisphenol A or polyglycols with (meth)acrylic acid forming a (meth)acrylate ester, with the polyglycols of which corresponding to the structure shown below:

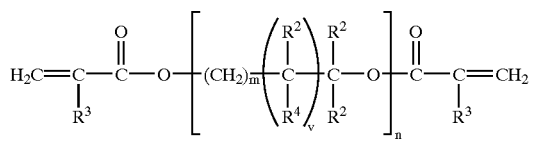

wherein $R^2$ may be selected from hydrogen, alkyl groups having from 1 to about 4 carbon atoms, hydroxyalkyl groups having from 1 to about 4 carbon atoms or

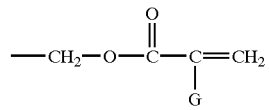

wherein G is as defined above;

$R^3$ may be selected from hydrogen, halogen, and alkyl groups of from 1 to about 4 carbon atoms;

$R^4$ may be selected from hydrogen, hydroxy and

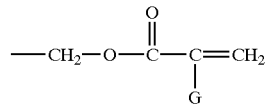

m is an integer equal to at least 1;

v is 0 or 1; and n is an integer equal to at least 1.

8. The composition according to claim 1, further comprising an inorganic and/or organic filler component selected from the group of glass fibers, synthetic fibers, reinforcing silicas, ceramic fiber whiskers, aluminum nitride, boron nitride, zinc oxide, magnesium oxide, aluminum oxide, silicon nitride, silica-coated aluminum nitride, quartz, natural fibers from plant and/or animal sources, and combinations thereof.

9. The composition according to claim 1, wherein the inorganic and/or organic filler component is present in an amount within the range of about 0.5 to about 35 weight percent, based on the total weight of the epoxy resin component.

10. The composition according to claim 1, wherein the transition metal complex is a member within the structure, $M_e[CW_3-CO-CH=C(O^-)-CW'_3]_2$, wherein $M_e$ is a member selected from the group consisting of Fe, Ti, Ru, Co, Ni, Cr, Cu, Mn, Pd, Ag, Rh, Pt, Zr, Hf, Nb, V, and Mo, and W and W' may be the same or different and may be selected from H, and halogens.

11. The composition according to claim 1, wherein the transition metal complex is a member selected from the group consisting of platinum (II) acetylacetonate, cobalt (II) acetylacetonate, cobalt (III) acetylacetonate, nickel (II) acetylacetonate, iron (II) acetylacetonate, iron (III) acetylacetonate, chromium (II) acetylacetonate, chromium (III) acetylacetonate, manganese (II) acetylacetonate, manganese (III) acetylacetonate and copper (II) acetylacetonate, and carboxylates and/or complexes of any of Fe, Ti, Ru, Co, Ni, Cr, Cu, Mn, Pd, Ag, Rh, Pt, Zr, Hf, Nb, V, and Mo.

12. The composition according to claim 1, wherein the transition metal complex is Cu(II)ACAC.

13. The composition according to claim 1, wherein the accelerator is present in an amount up to about 50 weight percent, based on the total weight of the epoxy resin hardener second component.

14. The composition according to claim 1, wherein the first component:second component ratio is in the it range of about 1:1 to about 10:1.

15. The composition according to claim 1, wherein the first component:second component ratio is about 2:1.

16. The composition according to claim 1, in combination with and between two mated substrates, at least one of which is constructed of metals selected from the group consisting of steel and aluminum; and synthetics constructed from materials selected from the group consisting of glass cloth phenolics, phenolic composites and plastics, wherein the composition when cured bonds together the two mated substrates.

17. A process for using the composition according to claim 1 to bond together two substrates, comprising the steps of:
applying the composition onto a surface of a first substrate; and
mating a surface of a second substrate in abutting relationship with the composition-applied first substrate to form an assembly, and maintaining the assembly in the mated abutting relationship for a time sufficient to allow the composition to cure.

18. A process for using the composition according to claim 1 to bond together two substrates, comprising the steps of:
applying the composition onto a surface of at least one of a first substrate or a second substrate, and maintaining each of the composition-applied substrate(s) away from the other substrate for a time sufficient to allow the composition to cure somewhat; and
mating the substrates in abutting relationship to form an assembly.

19. A process for using the composition according to claim 1 to bond together two substrates, comprising the steps of:
mating in spaced-apart relationship a first substrate with a second substrate; and
applying within the space the composition and maintaining in an assembly the first substrate and the second substrate for a time sufficient to allow the composition to cure.

20. A two-part, room-temperature curable composition having high flash point and low odor, comprising:
(a) a first component, comprising:
(i) an epoxy resin, and
(ii) (meth)acrylate component; and
(b) a second component, comprising:
(i) an epoxy resin hardener, and
(ii) a catalyst comprising a transition metal complex, further comprising an adhesion promoter selected from the group consisting of:

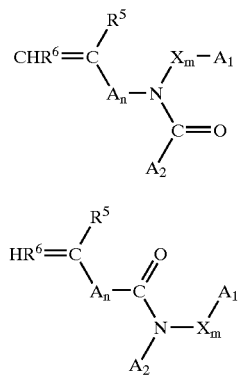

wherein $R^5$ and $R^6$ may be the same or different and may be selected from hydrogen or $C_{1-3}$ alkyl, or either of which may join to form a cyclic ring structure of between 4 and 10 ring atoms with themselves, or with $A_1$ or $A_2$ as defined below;
X and A may be the same or different and may be selected from $-(CR^7R^8)_p-$, where $R^7$ and $R^8$ may be the same or different and may be selected from hydrogen or $C_{1-3}$ alkyl, and p is an integer of from 0 to 3, metal complex, wherein the epoxy resin hardener of the second component includes polyether amine-based hardeners selected from the group consisting of oxyethylene diamines, oxyethylene triamines, polyoxyethylene diamines, polyoxyethylene triamines, oxypropylene diamines, oxypropylene triamines, polyoxypropylene diamines, polyoxypropylene triamines, dimethylene glycol dipropyl amine and/or derivatives and adducts thereof, and combinations thereof, and wherein cured reaction products of the composition demonstrate at least substantial maintenance of at least one physical property selected from the group consisting of fixture time, adhesion strength, and adhesion strength over time, after exposure to at least one condition selected from the group consisting of elevated temperatures, moisture and a chemical environment.

21. A two-part, room-temperature curable composition having high flash point and low odor, comprising:
(a) a first component, comprising:
(i) an epoxy resin, and
(ii) (meth)acrylate component; and
(b) a second component, comprising:
(i) an epoxy resin hardener, and
(ii) a catalyst comprising a transition
(ii) a catalyst comprising a transition metal complex, wherein the epoxy resin hardener of the second component includes polyether amine-based hardeners selected from the group consisting of compounds of the formula:

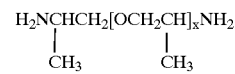

wherein x is from about 2.6 to about 33.1; compounds of the formula:

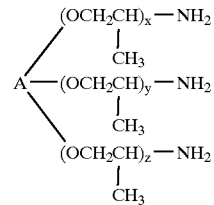

wherein A is a residue of glycerin or trimethylol propane, and x+y+z is from about 5 to about 85; compounds represented by the formula:

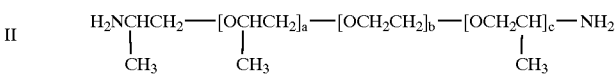

wherein a+c is about 2.5 and b is from about 2.5 to about 40.5; and combinations thereof, wherein cured reaction products of the composition demonstrate at least substantial maintenance of at least one physical property selected from the group consisting of fixture time, adhesion strength, and adhesion strength over time, after exposure to at least one condition selected from the group consisting of elevated temperatures, moisture and a chemical environment.

22. A two-part, room-temperature curable composition having high flash point and low odor, comprising:
(a) a first component, comprising:
(i) an epoxy resin, and
(ii) (meth)acrylate component; and (b) a second component, comprising:
(i) an epoxy resin hardener, and
an alklyene group,
an arylene group,
a carbonyl group, —CO—,
heteroatoms, and combinations thereof;
m and n may be the same or different and are 0 or 1; and
$A_1$ and $A_2$ may be the same or different and may be selected from hydrogen, $C_{1-3}$ alkyl, alkenyl, aryl, aryl heterocylic, acidic groups, and basic groups, and wherein cured reaction products of the composition demonstrate at least substantial maintenance of at least one physical property selected from the group consisting of fixture time, adhesion strength, and adhesion strength over time, after exposure to at least one condition selected from the group consisting of elevated temperatures, moisture and a chemical environment.

23. A two-part, room-temperature curable composition having high flash point and low odor, comprising:
(a) a first component, comprising:
(i) an epoxy resin, and
(ii) a (meth)acrylate component comprising at least one member selected from the group consisting of compounds of the formula $H_2C{=}CGCO_2R^1$, wherein G is hydrogen, halogen or alkyl groups having from 1 to about 4 carbon atoms, and $R^1$ is alkyl, cycloalkyl, alkenyl, cycloalkenyl, alkaryl, aralkyl or aryl groups having from 1 to about 16 carbon atoms, any of which may be optionally substituted or interrupted with oxygen, halogen, carbonyl, hydroxyl, ester, carboxylic acid, urea, urethane, carbonate, amine, amide, sulfur, sulfonate, and sulfone; (meth)acrylate compounds having a plurality of (meth)acrylate groups thereon; and mixtures thereof;
(b) a second component, comprising:
(i) a polyether amine-based epoxy resin hardener, and
(ii) a catalyst comprising a transition metal complex.

24. The composition according to claim 23, wherein the epoxy resin hardener of the second component is selected from the group consisting of oxyethylene diamines, oxyethylene triamines, polyoxyethylene diamines, polyoxyethylene triamines, oxypropylene diamines, oxypropylene triamines, polyoxypropylene diamines, polyoxypropylene triamines, dimethylene glycol dipropyl amine and/or derivatives and adducts thereof, and combinations thereof.

25. The composition according to claim 24, wherein the epoxy resin include the combination of a bisphenol A-type epoxy resin and sorbitol glycidyl ether.

26. The composition according to claim 25, wherein the epoxy resin hardener of the second component is selected from the group consisting of polyether amine-based hardeners selected from the group consisting of compounds of the formula:

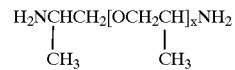

where x is from about 2.6 to about 33.1; compounds of the formula:

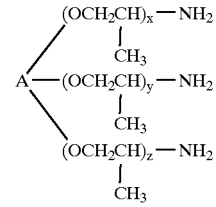

where A is a residue of glycerin or trimethylol propane, and x+y+z is from about 5 to about 85; compounds represented by the formula:

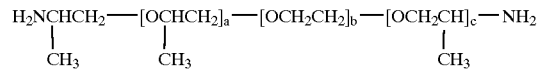

where a+c is about 2.5 and b is from about 2.5 to about 40.5; and combinations thereof.

27. The composition of claim 26, wherein the (meth)acrylate component of compounds of the formula $H_2C{=}CGCO_2R^1$, wherein G is hydrogen, halogen or alkyl groups having from 1 to about 4 carbon atoms, and $R^1$ is alkyl, cycloalkyl, alkenyl, cycloalkenyl, alkaryl, aralkyl or aryl groups having from 1 to about 16 carbon atoms, any of which may be optionally substituted or interrupted with oxygen, halogen, carbonyl, hydroxyl, ester, carboxylic acid, urea, urethane, carbonate, amine, amide, sulfur, sulfonate, and sulfone.

* * * * *